(12) United States Patent
DeChant et al.

(10) Patent No.: US 10,747,999 B2
(45) Date of Patent: Aug. 18, 2020

(54) METHODS AND SYSTEMS FOR PATTERN CHARACTERISTIC DETECTION

(71) Applicant: The Trustees of Columbia University in the City of New York, New York, NY (US)

(72) Inventors: Alan Chad DeChant, New York, NY (US); Hod Lipson, New York, NY (US); Rebecca J. Nelson, New York, NY (US); Michael A. Gore, New York, NY (US); Tyr Wiesner-Hanks, New York, NY (US); Ethan Stewart, New York, NY (US); Jason Yosinski, New York, NY (US); Siyuan Chen, New York, NY (US)

(73) Assignees: The Trustees of Columbia University in the City of New York, New York, NY (US); Cornell University, Ithaca, NY (US)

( * ) Notice: Subject to any disclaimer, the term of this patent is extended or adjusted under 35 U.S.C. 154(b) by 0 days.

(21) Appl. No.: 16/161,499

(22) Filed: Oct. 16, 2018

(65) Prior Publication Data

US 2019/0114481 A1    Apr. 18, 2019

Related U.S. Application Data

(60) Provisional application No. 62/573,902, filed on Oct. 18, 2017.

(51) Int. Cl.
*G06K 9/00* (2006.01)
*G06N 3/08* (2006.01)
(Continued)

(52) U.S. Cl.
CPC ........ *G06K 9/00657* (2013.01); *A01B 79/005* (2013.01); *G06K 9/00671* (2013.01);
(Continued)

(58) Field of Classification Search
CPC .... G06K 9/00; G06K 9/6273; G06K 9/00657; G06K 9/00671; G06K 9/4628;
(Continued)

(56) References Cited

U.S. PATENT DOCUMENTS 6,014,451 A * 1/2000 Berry ................. G06F 19/3418
382/110
6,248,063 B1 * 6/2001 Barnhill ................. G01N 33/50
600/300

(Continued)

FOREIGN PATENT DOCUMENTS

| CN | 106599925 A | 4/2017 |
|---|---|---|
| WO | 2016040784 A2 | 3/2016 |
| WO | 2017151757 A1 | 9/2017 |

OTHER PUBLICATIONS

Abu-Mostafa, Y. S., Magdon-Ismail, M., & Lin, H.-T. (2012). Learning from Data USA. Online publication AMLBook. http://amlbook.com/support.html.

(Continued)

*Primary Examiner* — Mahendra R Patel
(74) *Attorney, Agent, or Firm* — Occhiuti & Rohlicek LLP

(57) ABSTRACT

Disclosed are devices, systems, apparatus, methods, products, and other implementations, including a method to detect pattern characteristics in target specimens that includes acquiring sensor data for the target specimens, dividing the acquired sensor data into a plurality of data segments, and generating, by multiple neural networks that each receives the plurality of data segments, multiple respective output matrices, with each data element of the multiple respective output matrices being representative of a probability that corresponding sensor data of a respective one of the plurality of data segments includes a pattern characteristic in the target specimens. The method further includes (Continued)

determining by another neural network, based on the multiple respective output matrices generated by the multiple neural networks, a presence of the pattern characteristic in the target specimens.

18 Claims, 6 Drawing Sheets

(51) Int. Cl.
    *G06N 3/04*     (2006.01)
    *G06N 5/04*     (2006.01)
    *G06K 9/46*     (2006.01)
    *A01B 79/00*     (2006.01)
    *G06K 9/62*     (2006.01)

(52) U.S. Cl.
    CPC ......... *G06K 9/4628* (2013.01); *G06K 9/6273* (2013.01); *G06N 3/0454* (2013.01); *G06N 3/08* (2013.01); *G06N 3/084* (2013.01); *G06N 5/046* (2013.01)

(58) Field of Classification Search
    CPC .. G06N 3/04; G06N 3/08; G06N 5/04; G06N 3/084; G06N 5/046; G06N 3/0454; A01B 79/005; A61B 5/0464; A61B 5/7267; A61B 5/7232; C12Q 1/68; C12Q 1/6816; C06K 9/66; A16B 5/0068; A16B 5/0075; H04N 5/445; G06T 7/00; H04B 1/205; G06F 19/00; G06F 17/30
    USPC ............ 382/110, 157, 228, 133; 1/1; 706/48
    See application file for complete search history.

(56) References Cited

U.S. PATENT DOCUMENTS

| | | | | |
|---|---|---|---|---|
| 6,389,408 | B1* | 5/2002 | Carrieri | G01N 21/21 382/156 |
| 6,650,779 | B2* | 11/2003 | Vachtesvanos | G01N 21/956 348/88 |
| 7,747,070 | B2* | 6/2010 | Puri | G06N 3/063 382/157 |
| 7,801,591 | B1* | 9/2010 | Shusterman | A61B 5/0205 600/509 |
| 8,781,174 | B2* | 7/2014 | Tseng | G06K 9/00 348/135 |
| 8,923,569 | B2* | 12/2014 | Duarte | G16H 50/70 382/110 |
| 9,282,931 | B2* | 3/2016 | Tearney | A61B 1/00082 |
| 9,330,460 | B2* | 5/2016 | Lin | G06T 7/0014 |
| 9,527,115 | B2* | 12/2016 | LaRose | B07C 5/342 |
| 9,536,293 | B2* | 1/2017 | Lin | G06T 7/0002 |
| 10,271,117 | B2* | 4/2019 | Lankford | A01B 79/005 |
| 10,361,802 | B1* | 7/2019 | Hoffberg-Borghesani | H04N 21/4755 |
| 10,561,056 | B2* | 2/2020 | Peterson | A01B 79/005 |
| 10,564,316 | B2* | 2/2020 | Xu | G01V 99/005 |
| 10,575,454 | B2* | 3/2020 | De Nale | A01B 79/005 |
| 2002/0186875 | A1* | 12/2002 | Burmer | G06K 9/00127 382/133 |
| 2012/0219948 | A1* | 8/2012 | Yun | C12Q 1/6816 435/6.11 |
| 2014/0036054 | A1* | 2/2014 | Zouridakis | G06T 7/0012 348/77 |

OTHER PUBLICATIONS

Andrade-Sanchez, P., Gore, M. A., Heun, J. T., Thorp, K. R., Carmo-Silva, A. E., French, A. N., . . . & White, J. W. (2014). Development and Evaluation of a Field-Based High-Throughput Phenotyping Platform. Functional Plant Biology, 41(1), 68-79. DOI: 10.1071/FP13126.

Arnal Barbedo J. G. (2013). Digital Image Processing Techniques for Detecting, Quantifying and Classifying Plant Diseases. Springer Plus, 2(1), 660. DOI: 10.1186/2193-1801-2-660.

Blitz Kim. [Username]. (Dec. 8, 2016). Neural Networks for Machine Learning by Geoffrey Hinton [Coursera 2013]. Lecture 6E: RMSProp: Divide the gradient by a running average of its recent magnitude. [Video]. YouTube. https://www.youtube.com/watch?v=SJ48OZ_qlrc.

Bock, C. H., Parker, P. E., Cook, A. Z., & Gottwald, T. R. (2008). Visual Rating and the Use of Image Analysis for Assessing Different Symptoms of Citrus Canker on Grapefruit Leaves. Plant Disease, 92(4), 530-541. DOI: 10.1094/PDIS-92-4-0530.

Bock, C. H., Parker, P. E., & Cook, A. Z. (2009). Comparison of Assessment of Citrus Canker Foliar Symptoms by Experienced and Inexperienced Raters. Plant Disease, 93(4), :412-424. https://doi.org/10.1094/PDIS-93-4-0412.

Brewster, V. A., Carson, M. L., & Wicks III, Z. W. (1992). Mapping Components of Partial Resistance to Northern Leaf Blight of Maize Using Reciprocal Translocations. Phytopathology, 82(2), 225-229. DOI: 10.1094/phyto-82-225.

Cadieu, C. F., Hong, H., Yamins, D. L., Pinto, N., Ardila, D., Solomon, E. A., . . . & DiCarlo, J. J. (2014). Deep Neural Networks Rival the Representation of Primate IT Cortex for Core Visual Object Recognition. PLoS Computational Biology, https://doi.org/10.1371/journal.pcbi.1003963.

Chapman, S. C., Merz, T., Chan, A., Jackway, P., Hrabar, S., Dreccer, M. F., . . . & Jimenez-Berni, J. (2014). Pheno-Copter: A Low-Altitude, Autonomous Remote-Sensing Robotic Helicopter for High-Throughput Field-Based Phenotyping. Agronomy, 4(2), 279-301. https://doi.org/10.3390/agronomy4020279.

Chollet, F. (n.d.). Keras: Deep Learning for Humans. Documentation. Retrieved Mar. 27, 2020, from https://github.com/fchollet/keras.

Chung, C. L., Longfellow, J. M., Walsh, E. K., Kerdieh, Z., Van Esbroeck, G., Balint-Kurti, P., & Nelson, R. J. (2010). Resistance Loci Affecting Distinct Stages of Fungal Pathogenesis: Use of Introgression Lines for QTL Mapping and Characterization in the Maize-Setosphaeria Turcicapathosystem. BMC Plant Biology, 10(1), 103. https://doi.org/10.1186/1471-2229-10-103.

Dammer, K. H., Thöle, H., Volk, T., & Hau, B. (2009). Variable-rate fungicide spraying in real time by combining a plant cover sensor and a decision support system. Precision Agriculture, 10(5), 431-442.

Dechant, C., Wiesner-Hanks, T., Chen, S., Stewart, E. L., Yosinski, J., Gore, M. A., . . . & Lipson, H. (2017). Automated Identification of Northern Leaf Blight-Infected Maize Plants from Field Imagery Using Deep Learning. Phytopathology, 107(11), 1426-1432. DOI: 10.1094/PHYTO-11-16-0417-R.

Deery, D., Jimenez-Berni, J., Jones, H., Sirault, X., & Furbank, R. (2014). Proximal Remote Sensing Buggies and Potential Applications for Field-Based Phenotyping. Agronomy, 4(3), 349-379. DOI: 10.3390/agronomy4030349.

Fernandez, M. G. S., Bao, Y., Tang, L., & Schnable, P. S. (2017). A High-Throughput, Field-Based Phenotyping Technology for Tall Biomass Crops. Plant physiology, 174(4), 2008-2022. DOI: 10.1104/pp.17.00707.

Fuentes, A., Yoon, S., Kim, S. C., & Park, D. S. (2017). A Robust Deep-Learning-Based Detector for Real-Time Tomato Plant Diseases and Pests Recognition. Sensors, 17(9), 2022. DOI: 10.3390/s17092022.

Galiano-Carneiro, A. L., & Miedaner, T. (2017). Genetics of Resistance and Pathogenicity in the Maize/Setosphaeria Turcica Pathosystem and Implications for Breeding. Frontiers in Plant Science, 8, 1490. DOI: 10.3389/fpls.2017.01490.

Glorot, X., & Bengio, Y. (May 13-15, 2010). Understanding the Difficulty of Training Deep Feedforward Neural Networks. In X. Glorot & Y. Bengio (Ed.), Proceedings of the 13th International Conference on Artificial Intelligence and Statistics (AISTATS10), (pp. 249-256). Chia Laguna Resort, Sardinia, Italy: Proceedings of Machine Learning Research. http://proceedings.mlr.press/v9/glorot10a/glorot10a.pdf.

Goff, S. A., Vaughn, M., McKay, S., Lyons, E., Stapleton, A. E., Gessler, D., . . . & Muir, A. (2011). The Plant collaborative:

(56) References Cited

OTHER PUBLICATIONS cyberinfrastructure for plant biology. Frontiers in Plant Science, 2(34), 1-16. https://doi.org/10.3389/fpls.2011.00034.

Haghighattalab, A., Pérez, L. G., Mondal, S., Singh, D., Schinstock, D., Rutkoski, J., . . . & Poland, J. (2016). Application of Unmanned Aerial Systems for High Throughput Phenotyping of Large Wheat Breeding Nurseries. Plant Methods, 12(1), 35. DOI: 10.1186/s13007-016-0134-6.

He, K., Zhang, X., Ren, S., & Sun, J. (2015). Delving Deep into Rectifiers: Surpassing Human-Level Performance on ImageNet Classification. In Proceedings of the 2015 IEEE International Conference on Computer Vision (ICCV), (pp. 1026-1034). IEEE Computer Society. https://arxiv.org/abs/1502.01852.

Ioffe, S., & Szegedy, C. (2015). Batch Normalization: Accelerating Deep Network Training by Reducing Internal Covariate Shift. arXiv:1502.03167.

Kingma, D., & BA, J. (2014). Adam: A Method for Stochastic Optimization. https://arxiv.org/abs/1412.6980.

Lecun, Y., Bengio, Y., & Hinton, G. (May 28, 2015). Deep learning. Nature, 521, 436-444. DOI:10.1038/nature14539.

Mohanty, S. P., Hughes, D. P., & Salathé, M. (2016). Inference of Plant Diseases from Leaf Images through Deep Learning. arXiv. https://arxiv.org/abs/1604.03169v1.

Mohanty, S. P., Hughes, D. P., & Salathé, M. (2016). Using Deep Learning for Image-Based Plant Disease Detection. Frontiers in Plant Science, 7, 1419. DOI: 10.3389/fpls.2016.01419.

Mueller, D. S., Wise, K. A., Sisson, A. J., Allen, T. W., Bergstrom, G. C., Bosley, D. B., . . . & Collins, A. (2016). Corn Yield Loss Estimates Due to Diseases in the United States and Ontario, Canada from 2012 to 2015. Plant Health Progress, 17(3), 211-222. DOI: 10.1094/PHP-RS-16-0030.

Oerke, E. C., & Define, H. W. (2004). Safeguarding production—losses in major crops and the role of crop protection. Crop Protection, 23(4), 275-285. DOI:10.1016/j.cropro.2003.10.001.

Pauli, D., Chapman, S. C., Bart, R., Topp, C. N., Lawrence-Dill, C. J., Poland, J., & Gore, M. A. (2016). The Quest for Understanding Phenotypic Variation Via Integrated Approaches in the Field Environment. Plant Physiology, 172(2), 622-634. DOI: 10.1104/pp.16.00592.

Perkins, J. M., & Pedersen, W. L. (1987). Disease Development and Yield Losses Associated with Northern Leaf Blight on Corn. Plant Disease, 71(10), 940-943.

Poland, J. A., & Nelson, R. J. (2011). In the Eye of the Beholder: The Effect of Rater Variability and Different Rating Scales on QTL Mapping. Phytopathology, 101(2), 290-298. DOI: 10.1094/PHYTO-03-10-0087.

Ramcharan, A., Baranowski, K., McCloskey, P., Ahmed, B., Legg, J., & Hughes, D. (2017). Using Transfer Learning for Image-Based Cassava Disease Detection. arXiv:1707.03717. DOI: 10.3389/fpls.2017.01852.

Raymundo, A. D., AD, R., & AL, H. (1981). Measuring the Relationship Between Northern Corn Leaf Blight and Yield Losses. Plant Disease, 65, 325-327.

Sankaran, S., Khot, L. R., Espinoza, C. Z., Jarolmasjed, S., Sathuvalli, V. R., Vandemark, G. J., . . . & Pavek, M. J. (2015). Low-altitude, high-resolution aerial imaging systems for row and field crop phenotyping: A review. European Journal of Agronomy, 70, 112-123.

Shankara, K., & Gowda, K. T. P. (2011). Assessment of yield loss due to turcicum leaf blight of maize caused by Exserohilum turcicum. Mysore Journal of Agricultural Sciences, 45(3), 691-692. [Abstract].

Sherwood, R. T., Berg, C. C., Hoover, M. R., & Zeiders, K. E. (1983). Illusions in Visual Assessment of Stagonospora Leaf Spot of Orchardgrass. Phytopathology, 73(2), 173-177.

Singh, A., Ganapathysubramanian, B., Singh, A. K., & Sarkar, S. (2016). Machine Learning for High-Throughput Stress Phenotyping in Plants. Trends in Plant Science, 21(2), 110-124. https://doi.org/10.1016/j.tplants.2015.10.015.

Sladojevic, S., Arsenovic, M., Anderla, A., Culibrk, D., & Stefanovic, D. (2016). Deep Neural Networks Based Recognition of Plant Diseases by Leaf Image Classification. Computational Intelligence and Neuroscience, 2016. DOI: 10.1155/2016/3289801.

Stewart, E. L., & McDonald, B. A. (2014). Measuring Quantitative Virulence in the Wheat Pathogen *Zymoseptoria tritici* Using High-Throughput Automated Image Analysis. Phytopathology, 104(9), 985-992. https://doi.org/10.1094/PHYTO-11-13-0328-R.

Sun, Y., Liu, Y., Wang, G., & Zhang, H. (2017). Deep Learning for Plant Identification in Natural Environment. Computational Intelligence and Neuroscience, 2017. DOI: 10.1155/2017/7361042.

Tackenberg, M., Volkmar, C., & Dammer, K. H. (2016). Sensor-based variable-rate fungicide application in winter wheat. Pest Management Science, 72(10), 1888-1896. https://doi.org/10.1002/ps.4225.

The Theano Development Team, Al-Rfou, R., Alain, G., Almahairi, A., Angermueller, C., Bahdanau, D., . . . & Zhang, Y. (2016). Theano: A Python framework for fast computation of mathematical expressions. https://arxiv.org/abs/1605.02688.

Wang, G., Sun, Y., & Wang, J. (2017). Automatic Image-Based Plant Disease Severity Estimation Using Deep Learning. Computational Intelligence and Neuroscience, 2017. DOI: 10.1155/2017/2917536.

Wang, P., Souma, K., Kobayashi, Y., Iwabuchi, K., Sato, C., & Masuko, T. (2010). Influences of Northern Leaf Blight on corn silage fermentation quality, nutritive value and feed intake by sheep. Animal Science Journal, 81(4), 487-493. https://doi.org/10.1111/j.1740-0929.2010.00757.

Welz, H. G., & Geiger, H. H. (2000). Genes for resistance to northern corn leaf blight in diverse maize populations. Plant Breeding, 119(1), 1-14. https://doi.org/10.1046/j.1439-0523.2000.00462.x.

Xie, W., Yu, K., Pauls, K. P., & Navabi, A. (2012). Application of Image Analysis in Studies of Quantitative Disease Resistance, Exemplified Using Common Bacterial Blight—Common Bean Pathosystem. Phytopathology, 102(4), 434-442. https://doi.org/10.1094/PHYTO-06-11-0175.

\* cited by examiner

METHODS AND SYSTEMS FOR PATTERN CHARACTERISTIC DETECTION

CROSS-REFERENCE TO RELATED APPLICATIONS

This application claims the benefit of U.S. Provisional Application No. 62/573,902, entitled "METHODS AND SYSTEMS FOR PATTERN CHARACTERISTIC DETECTION" and filed Oct. 18, 2017, the content of which is incorporated herein by reference in its entirety.

STATEMENT REGARDING FEDERALLY SPONSORED RESEARCH

This invention was made with government support under grant 1527232 awarded by the National Science Foundation. The government has certain rights in the invention.

BACKGROUND

An estimated 13% of global potential crop yield is lost to diseases each year, with much higher losses occurring under epidemic conditions. For example, northern leaf blight (NLB), also called northern corn leaf blight or *turcicum* blight, is a fungal foliar disease of maize caused by *Setosphaeria turcica* (anamorph: *Exserohilum turcicum*). In the United States and Ontario, NLB has been growing especially severe in recent years, with estimated yield losses rising steadily from 1.9 million metric tons in 2012 to 14 million metric tons in 2015. This estimated yield loss from NLB accounted for one-fourth of all estimated yield losses from disease in 2015, causing an estimated economic loss of $1.9 billion.

To evaluate resistance of plant germplasm and breed for improved resistance, conventional visual assessments of disease incidence or severity are used. However, such assessments are prone to error through inter- and intra-rater variations, which can reduce precision and accuracy of genetic inferences. Similar detection problems arise when attempting to identify or assess the presence of certain pattern characteristics (which may correspond to different abnormal conditions) in other types of specimens.

SUMMARY

Disclosed are systems, methods, and other implementations to detect pattern characteristics, which may correspond to different abnormal conditions (e.g., diseases), in various organisms (plants, animals, humans, cellular cultures of living organisms, etc.), or other specimen types.

In some variations, a method to detect pattern characteristics in target specimens is provided that includes acquiring sensor data for the target specimens, dividing the acquired sensor data into a plurality of data segments, and generating, by multiple neural networks that each receives the plurality of data segments, multiple respective output matrices, with each data element of the multiple respective output matrices being representative of a probability that corresponding sensor data of a respective one of the plurality of data segments includes a pattern characteristic in the target specimens. The method further includes determining by another neural network, based on the multiple respective output matrices generated by the multiple neural networks, a presence of the pattern characteristic in the target specimens.

Embodiments of the method may include at least some of the features described in the present disclosure, including one or more of the following features.

The pattern characteristic may be indicative of an abnormality of the target specimens.

Acquiring the sensor data for the target specimens may include acquiring image data for crop objects.

Acquiring the image data for the crop objects may include capturing one or more of, for example, an aerial image of the crop objects, or a ground-based image of the crop objects.

The image data for the crop objects may include one or more images of corn crops, and the presence of the pattern characteristic in the corn crops may be indicative of the presence of a northern leaf blight (NLB) disease in the corn corps.

The method may further include providing training image data to train the multiple neural networks and the other neural network to detect the NLB disease. Dividing the acquired sensor data into the plurality of data segments may include identifying a lesion with a lesion axis in one or more images of the corn crops, defining multiple image segments of predetermined dimensions that are each shifted, from another of the multiple image segments, by a predetermined length of pixels and having a center at a randomly selected location within a predetermined radius of pixels from the lesion axis of the lesion, and rotating the each of the defined multiple image segments by a random rotation angle.

Generating the multiple respective output matrices may include providing the plurality of data segments to a plurality of convolutional neural network (CNN) units, determining for a particular data segment, from the plurality of data segments, multiple probability values generated respectively by each of the plurality of CNN units, and writing at a particular location, corresponding to the particular data segment, in each of the multiple respective output matrices, respective ones of the multiple probability values determined for the particular data segment.

The acquiring, dividing, generating, and determining may be performed in real-time.

At least some of the dividing, generating, and determining may be performed offline.

Determining by the other neural network the presence of the pattern characteristic in the target specimens may include determining by the other neural network the presence of the pattern characteristic in the target specimens further based on at least a portion of the acquired sensor data.

Determining the presence of the pattern characteristic in the target specimens may include determining a percentage measure of the pattern characteristic in the target specimens.

Acquiring the sensor data for the target specimens may include acquiring for the target specimens one or more of, for example, visible range optical data, non-visible range optical data, RF data, or environmental data.

In some variations, a detection system to detect pattern characteristics in target specimens is provided. The system includes one or more sensors to acquire sensor data for the target specimens, a controller to divide the acquired sensor data into a plurality of data segments, and multiple neural networks, each configured to receive the plurality of data segments and to generate multiple respective output matrices, with each data element of the multiple respective output matrices being representative of a probability that corresponding sensor data of a respective one of the plurality of data segments includes a pattern characteristic in the target specimens. The system further includes another neural network configured to determine, based on the multiple respective output matrices generated by the multiple neural networks, a presence of the pattern characteristic in the target specimens.

Embodiments of the detection system may include at least some of the features described in the present disclosure, including at least some of the features described above in relation to the method, as well as one or more of the following features.

The one or more sensors may include at least one light-capture device to acquire image data for crop objects, with the image data comprising one or more of, for example, an aerial image of the crop objects, and/or a ground-based image of the crop objects.

The image data for the crop objects may include one or more images of corn crops, and the presence of the pattern characteristic in the corn crops may be indicative of the presence of a northern leaf blight (NLB) disease in the corn corps. The controller may further be configured to provide training image data to train the multiple neural networks and the other neural network to detect the NLB disease, and train the multiple neural networks and the other neural network using the training image data, including to identify a lesion with a lesion axis in at least one image, of the corn crops, from the image data, define multiple image segments, from the at least one image, of predetermined dimensions that are each shifted, from another of the multiple image segments, by a predetermined length of pixels and having a center at a randomly selected location within a predetermined radius of pixels from the lesion axis of the lesion, and rotate the each of the defined multiple image segments by a random rotation angle.

The multiple neural networks configured to generate multiple respective output matrices may each be configured to provide the plurality of data segments to a plurality of convolutional neural network (CNN) units, determine for a particular data segment, from the plurality of data segments, multiple probability values generated respectively by each of the plurality of CNN units, and write at a particular location, corresponding to the particular data segment, in each of the multiple respective output matrices, respective ones of the multiple probability values determined for the particular data segment.

The at least one other neural network configured to determine the presence of the pattern characteristic in the target specimens may be configured to determine the presence of the pattern characteristic in the target specimens further based on at least a portion of the acquired sensor data.

At least one of the one or more sensors may include one or more of, for example, a visible range optical sensor, a non-visible range optical sensor, a RF receiver, and/or a sensor to measure one or more environmental characteristics.

In some variations, an apparatus to detect pattern characteristics in target specimens is provided. The apparatus includes means for acquiring sensor data for the target specimens, means for dividing the acquired sensor data into a plurality of data segments, and means for generating, by multiple neural networks that each receives the plurality of data segments, multiple respective output matrices, with each data element of the multiple respective output matrices being representative of a probability that corresponding sensor data of a respective one of the plurality of data segments includes a pattern characteristic in the target specimens. The apparatus further includes means for determining by another neural network, based on the multiple respective output matrices generated by the multiple neural networks, a presence of the pattern characteristic in the target specimens.

In some variations, a non-transitory computer readable media is provided, with the media storing a set of instructions, executable on at least one programmable device, to acquire sensor data for target specimens, divide the acquired sensor data into a plurality of data segments, and generate, by multiple neural networks that each receives the plurality of data segments, multiple respective output matrices, with each data element of the multiple respective output matrices being representative of a probability that corresponding sensor data of a respective one of the plurality of data segments includes a pattern characteristic in the target specimen. The set of instructions also includes instructions to determine by another neural network, based on the multiple respective heatmaps generated by the multiple neural networks, a presence of the abnormality in the target specimens.

Embodiments of the apparatus and the computer readable media may include at least some of the features described in the present disclosure, including at least some of the features described above in relation to the method and to the detection system.

Other features and advantages of the invention are apparent from the following description, and from the claims.

BRIEF DESCRIPTION OF THE DRAWINGS

These and other aspects will now be described in detail with reference to the following drawings.

Like reference symbols in the various drawings indicate like elements.

DESCRIPTION

Described herein are systems, devices, apparatus, methods, computer program products, media, and other implementations to detect pattern characteristics (e.g., corresponding to abnormal conditions, such as diseases) in various organisms (plants, animals, humans, cellular cultures of living organisms, etc.) or other specimens' types. In example implementations, a system is provided that is configured to automatically identify a pattern characteristic (which may correspond to an abnormal condition) from sensor data of a specimen (e.g., identifying NLB lesions in field-acquired images of maize plants with high reliability). This approach uses a computational pipeline of convolutional neural networks (CNN) that addresses the challenges of limited data and the myriad irregularities in the obtained data (e.g., irregularities in images of field grown plants). In example implementations to detect NLB lesions, several CNN were trained to classify small regions of images as containing NLB lesions or not. Their predictions were combined into separate matrices (also referred to as heatmaps), then fed into a final, different, CNN trained to classify the entire image as containing diseased plants or not. In testing and evaluation of the implementations described herein, the system achieved 96.7% accuracy on test set images not used in training. Similar systems, mounted on aerial- or ground-based vehicles, can help in automated high-throughput plant phenotyping, precision breeding for disease resistance, and reduced pesticide use through targeted application across a variety of different living organisms (plant, animal, human) and condition/disease categories.

In the example of detecting NLB, in order to reliably distinguish between NLB lesions and other forms of damaged or senescent leaf tissue, an NLB lesion detection system that uses convolutional neural network (CNN) machines to implement a multi-stage (e.g., three stages) image analysis pipeline was realized. Neural networks are in general composed of multiple layers of linear transformations (multiplications by a "weight" matrix), each followed by a nonlinear function. The linear transformations are learned during training by making small changes to the weight matrices that progressively make the transformations more helpful to the final classification task. The learned multilayer processing of visual input that occurs in a CNN is thought to be analogous to how the primate visual system processes information; early stages of the networks respond to basic visual elements such as lines while higher levels of the networks respond to more complicated or abstract visual concepts such as object category. Convolutional layers allow a network to efficiently learn features that are invariant to an exact location in an image by applying the same learned transformation to subsections of an entire image.

Figure 1:
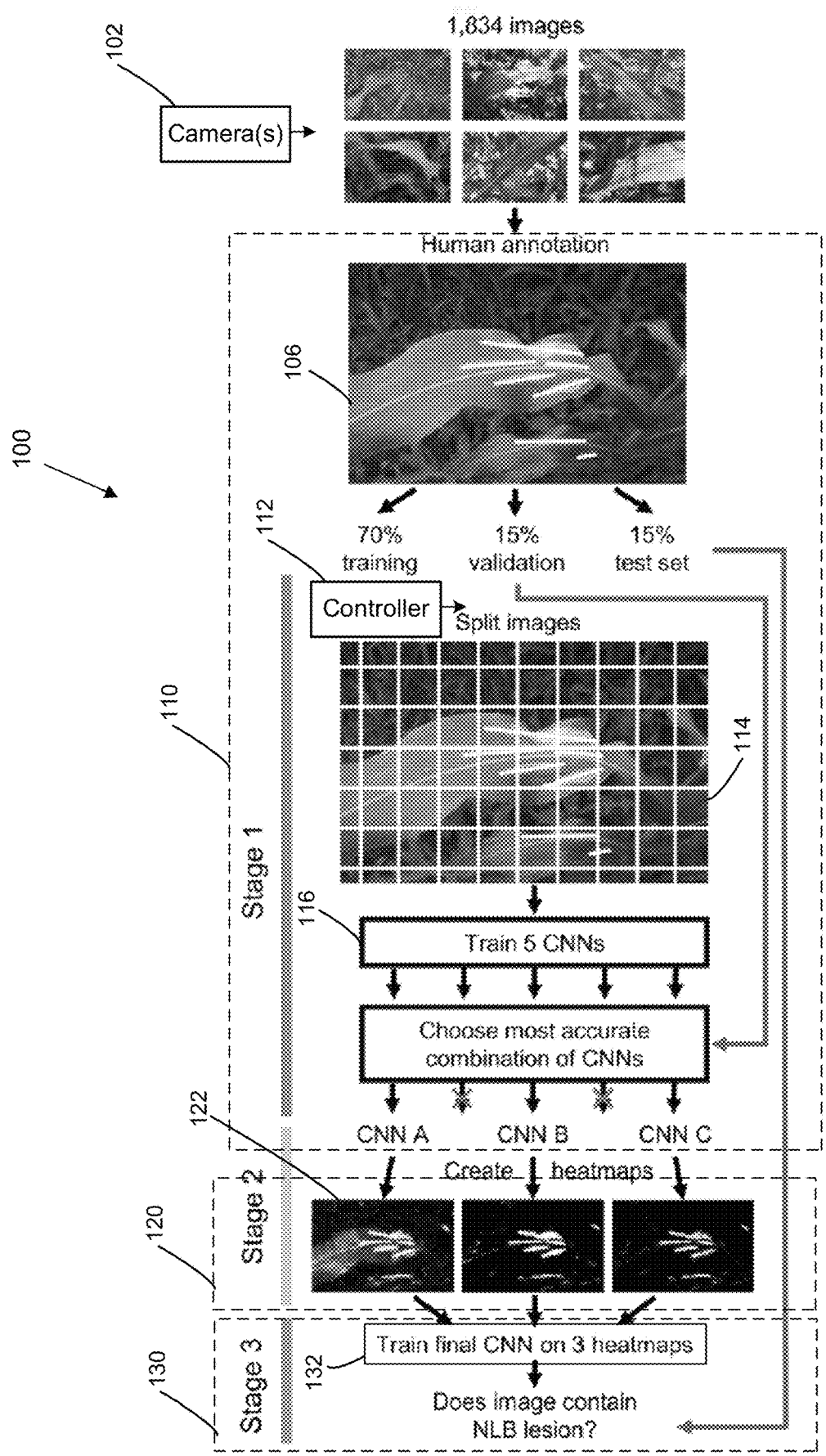
FIG. 1 is a diagram of a multi-stage system to detect pattern characteristics in specimens.

Thus, with reference to FIG. 1, is a diagram of a three-stage system 100 to detect abnormal conditions in organisms (or other specimens) is shown. The example system 100 depicted in FIG. 1 also includes details about the training process realized to train the learning engines (machines) comprising the system 100. The training data is generally used at some earlier time when the system is initially being configured (prior to becoming operational or being deployed to process actual data), and during normal operation actual data is processed by the system 100. However, in some embodiments, output of the system 100 using actual raw data may be used to also periodically further train the system 100 (e.g., by having an administrator or user confirm the accuracy of the results obtained by the system 100 for actual data, and adjusting the configuration of the system 100 accordingly).

The system 100 implements a multi-stage processing pipeline to determine whether a specimen, or target, has a pattern characteristic, corresponding to a condition that the system is trained to detect. The multi-stage pipeline of the example system 100 implements a three-stage pipelines, but adding, combining, or separating different processing operations can result in a different number of stages. In a first stage 110, the system 100 implements data pre-processing and a first level of multi-learning engine classification performed on the pre-processed data. Thus, to realize stage 1, the system 100 includes a data pre-processing processor/controller 112 configured to segment measurement/sensor data, representative of the specimen to be evaluated (e.g., whether the specimen contains indications of abnormalities, such as a disease afflicting it), into a plurality of data segments. The sensor data may include image data, obtained from one or more image capture devices (such as a camera 102 illustrated in FIG. 1) that are mounted on an aerial platform (e.g., a drone flying over a field of crops), ground-based platforms (e.g., ground vehicles roaming in a field of crops), and/or hand-held image capture devices. The output 114 of the pre-processing processor/controller 112 includes segmented data, which may include substantially uniform-sized data blocks or data blocks of varying sizes. For example, depending on the level of information determined to be contained within image regions, regions containing a higher density of information, as determine by variability of information within the regions, may be segmented into segments of smaller sizes. In some implementations, other types of data may be used (and pre-processed) as alternative or additional input fed to the learning engines used by the system 100. For example, cameras configured to obtain data in the non-visible range (e.g., infrared, UV, etc.) may be used to obtain image data for the specimen (target object(s)). Additional examples of data that may be used to detect specific pattern characteristics in the specimens or targets examined include RF data, environmental data (e.g., temperature, humidity, etc.), and so on.

As further illustrated in FIG. 1, the system 100 additionally includes multiple independent CNN's 116 (depicted schematically as included in a single module, but each CNN may be implemented as a separate module or circuitry component) trained to detect the presence of pattern characteristics (e.g., lesions) in small patches (segments) of the images (each CNN may be trained using different training data sets). The CNN's 116 receive the segmented data as part of the stage 1 processing, and generate, as part of the stage 2 (120) processing, output matrices (also referred to as heatmaps) indicating the probability that the pattern characteristic to be detected (which may correspond to the probability of infection) is present in the regions of the images. For example, each data point in a generated heatmap may represent a probability of infection, as determined by a corresponding one of the CNN's 116, that the segment/region of the image corresponding to that heatmap data point, or pixel, contains an abnormality (e.g., infected by NLB, in the example of NLB detection). In some embodiments, the system 100 may train N CNN engines, and then select from those N classifier engines a subset of the most accurate classifiers to perform the pattern characteristic detection processing on actual data. For example, in the case of the NLB detection, five (5) classifiers were trained, from which a subset of three classifiers (determined to be the most accurate based on some pre-defined error criterion) were selected to perform the actual detection processing.

Training of the CNN classifiers of stage 1 may be performed as follows. Training image data may be broken up into small segments (e.g., by the controller 112), such as segments of, for example, 224 by 224 pixels. For training purposes, training personnel may mark or annotate a training data set (in some examples, the annotation task may be outsourced to third-party personnel through a platform such as Mechanical Turk (MTurk)). In the example of training the system 100 to detect NLB, an image 106 may be annotated by a trainer to identify regions with NLB lesions, and further identify or define a lesion axis. In some embodiments, a lesion axis may be determined based on automatic filtering/processing procedures (which may also be implemented using the controller 112) to identify structures that are similar to lesion shapes (e.g., identifying contours of candidate lesions and determining if their morphology is substantially close to, in a mathematical sense, to typical contours of an actual lesion). In some embodiments, identification of lesion may be performed by an independent learning engine configured (through previous training) to identify candidate lesions. Alternatively, a hybrid process that combines human annotation of images (to identify lesions) and automated identification of lesions may be used. For example, automatically identified lesions may be assigned a confidence metric, and lesions with a confidence metric below a certain high reference threshold (and optionally above a low reference threshold/level, that together define a range) may be passed to a human assessor that can annotate the image. Images in which identified lesion are above the high reference threshold may be deemed to include the identified lesion, while automatically identified lesions with a confidence score/metric below the low reference threshold may be deemed to not include a lesion (or the image may be discarded).

Training image segments (process to be annotated with identified lesions and their lesion axes) may then be generated by moving down the length of the lesion, e.g., 10 pixels at a time and centering the target segment in a randomly chosen location ±15 pixels from a major axis of the lesion. A random rotation may then be applied to the image before the final segmentation, which allows, for example, six slightly different images to be produced from the same area. Non-lesion training segments may also be produced from the non-infected images in a similar fashion, i.e., by randomly rotating segments drawn from the entire image.

After training one network on the smaller image patches, that network may be used to select images to augment the data set (a technique called hard negative mining). Images of non-infected plants may be broken up into, for example, regions of 224 by 224 pixels using a sliding window approach with a pre-determined step size of, for example, 55. Because the original training images may be randomly rotated and nudged up or down, only a small fraction (e.g., fewer than 0.1% in some embodiments) of these newly generated segments could be identical to the first training set. These image segments can be fed into the trained neural network. Image segments that are incorrectly classified as containing lesions may then added to the training set. Versions of these images may also be added be the training set after they are flipped horizontally and vertically.

Figure 6:
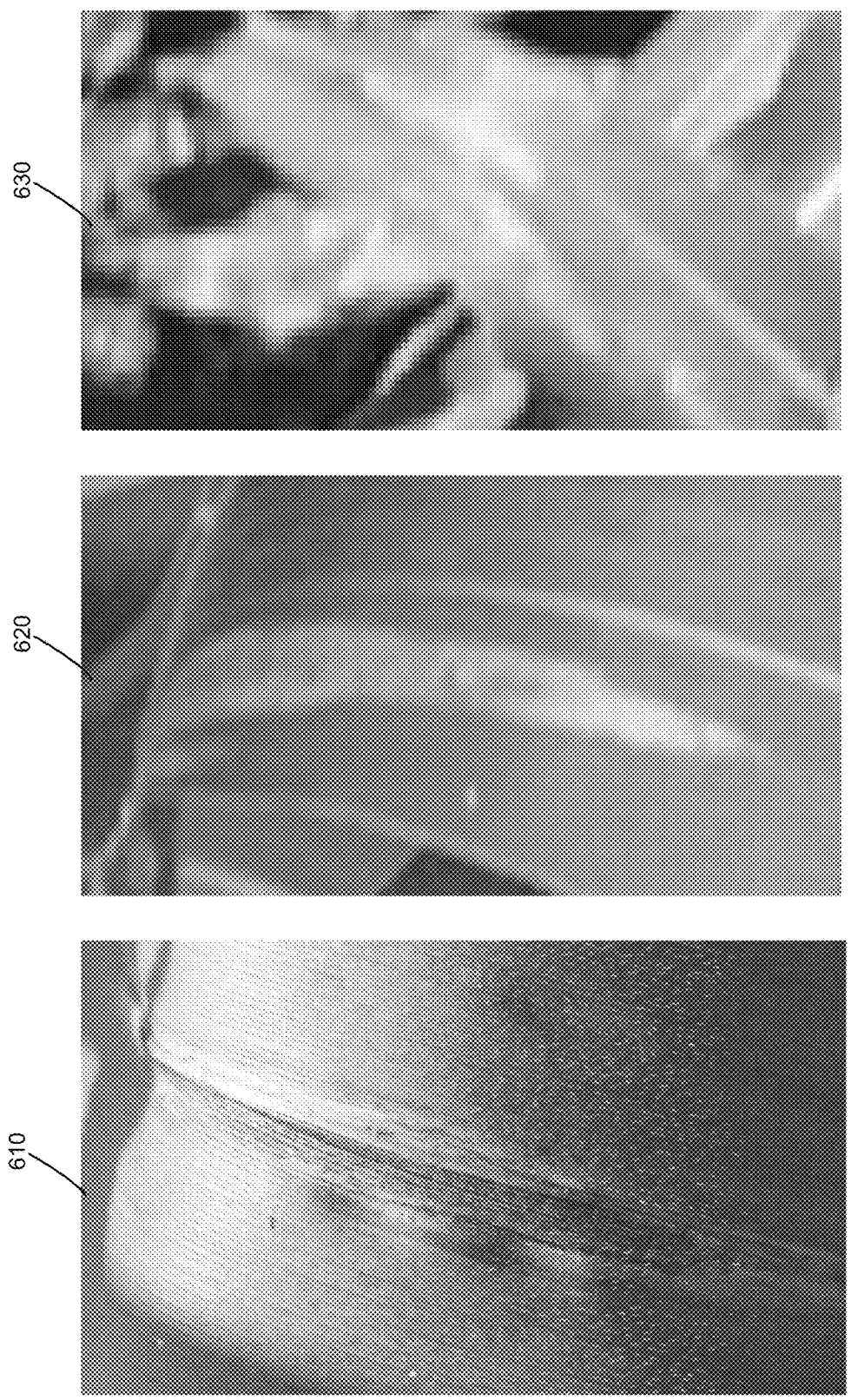
FIG. 6 provides example representative images of NLB lesions obtained using a handheld device, a boom device, and an unmanned aerial vehicle (UAV).

Image data used may be collected using different devices and/or platforms that provide different viewing perspectives and resolutions of the specimens analyzed. In an example training and prediction procedure that was implemented during testing and evaluation of the systems and methods described herein, some of the image data used was collected by a handheld device with a digital single-lens reflex (DSLR) camera with angle and field of view variable. Another set of image data was collected using a DSLR was mounted on a boom (~5 m from ground, nadir view), and a further set of test image data was collected by an unmanned aerial vehicle (UAV) images to obtain aerial photographs of 4 acres of various (nadir view). FIG. 6 provides example representative images of NLB lesions obtained, respectively, through the handheld device (see image 610), the boom device (see image 620), and the UAV (see image 630). For all handheld images, lesions were marked down the main axis with a line. For boom images, images were split in four and lesions were marked using an ImageJ macro. The handheld image set was split into three groups: 1) a training set that was used to train the initial networks, 2) a validation set that was used to choose three well-performing networks for input to stage 3 of the processing pipeline, and 3) a test set used for testing accuracy of the final CNN. In the example implementation, training of CNNs was performed in three stages: stage i) training set images subdivided and CNNs trained on smaller sub-images, stage ii) CNNs predicted lesion presence/absence along a sliding window, generating heat maps of confidence that a lesion is present at a given location, and stage iii) A third CNN was trained on heat maps output by CNNs A/B/C from Stage 2. in this example implementation, three distinct CNNs were trained on the training set. The three CNNs differed in architecture, balance of lesion/non-lesion images, and source of non-lesion images. Some non-lesion images were generated by hard negative mining (iteratively adding non-lesions images that a CNN initially misclassified as containing lesions to the training set). More particularly, a first CNN (CNN A) used equal parts lesion and non-lesion images (with only negatively mined non-lesion images being used). A second CNN (CNN B) used a 6:1 ratio of non-lesion images to lesion images. For that CNN, original non-lesion images and negatively mined images were used. A third CNN (CNN C) used a 6:1 ratio of non-lesion images to lesion images. For the third CNN, original non-lesion images and negatively mined images used.

With continued reference to FIG. 1, the multiple trained CNN's 116 that receive the pre-processed data 114 in stage 1 are configured to generate output matrices (heatmaps) 122 in a second stage (stage 2) 120. One set of heatmaps is produced from each CNN trained to classify small patches of the images (or other types of data) in stage 1. An output matrix, or heatmap, may comprise a single row of probability elements (i.e., the output matrix may have dimensions of 1×m, where m is the number of columns), while in some other embodiments the output matrix may haven rows of probability elements (i.e., a matrix of dimensions n×m). In some implementations, a sliding window approach may be used with a step size of, for example, 30, to feed sections of the larger images through each of the neural networks. The output may be recorded for each region/location in the images, and can be interpreted as the probability that each section contains a lesion. Each probability is assembled into a matrix in its appropriate place so as to represent the output of a network for each area or region of the image.

Figure 2:
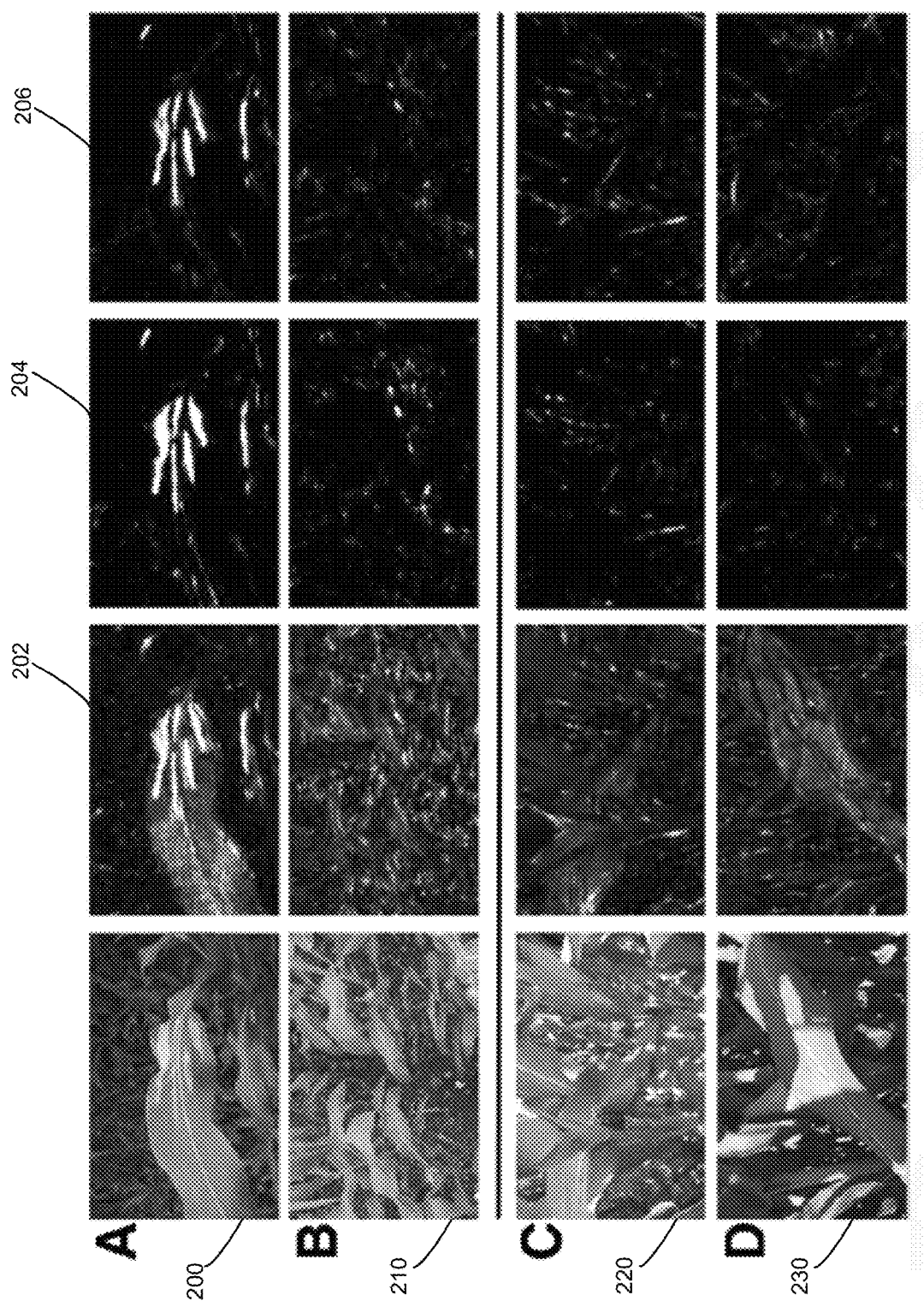
FIG. 2 are examples of images and their associated heatmaps.

FIG. 2 includes examples of images and their associated heatmaps (i.e., output matrices). Particularly, images 200 and 210 are example images of crops containing lesions, while images 220 and 230 are example images of crops not containing lesions. In the example of FIG. 2, three heatmaps for each of the images 200, 210, 220, and 230 were generated using three different CNN's (which may correspond to the CNN A, B, C illustrated in FIG. 1). For example, an image 202 corresponds to a heatmap for the image 200 generated using a first CNN, an image 204 corresponds to a heatmap for the image 200 using a second CNN (B), and an image 206 corresponds to a heatmap generated using a third CNN. The other heatmaps provided in FIG. 2 similarly include the heatmaps generated by the same three CNN's for the images 210, 220, and 230. As shown, heatmaps are shaded to indicate the output score representative of a probability of an image segment containing a lesion. A probability of '1' (one) corresponds to white while pixel, and a probability of '0' (zero) is represented by black. Intermediate probability values are represented by shades of gray.

Turning back to FIG. 1, in a third stage (130) implemented by the detection systems described herein, at least one other trained learning engine 132, such as another CNN (separate from the multi-CNN's used to generate the heatmaps from the subdivided images), is configured to classify each entire image as containing or not containing abnormal specimen (e.g., containing or not containing infected leaves in the NLB example). In some embodiments, neural networks were trained on various combinations of the heatmaps. The heatmaps were "stacked" on top of each other, each occupying a different channel of the input. Input from three heatmaps of the same underlying image, for example, would occupy three channels just as a color image would be composed of three channels (e.g., red, green, and blue). They may be flipped horizontally and vertically and rotated during training to augment their number. In some embodiments, various combinations of the heatmap sets were used for training and a selection of three heatmap set was made based on validation set performance. In some embodiments, the heatmaps generated (at stage 2) may be used (e.g., by a learning engine such as the learning engine 132) to provide an estimate of the percentage of the data that corresponds to the pattern characteristic that is being detected (e.g., leaf area inn a captured image that is suspected of being diseased). Thus, in such embodiments, instead of merely providing a yes/no output, the system 100 is configured to compute a quantitative measure in relation to the input data (e.g., percentage of diseased crops).

Figure 3:
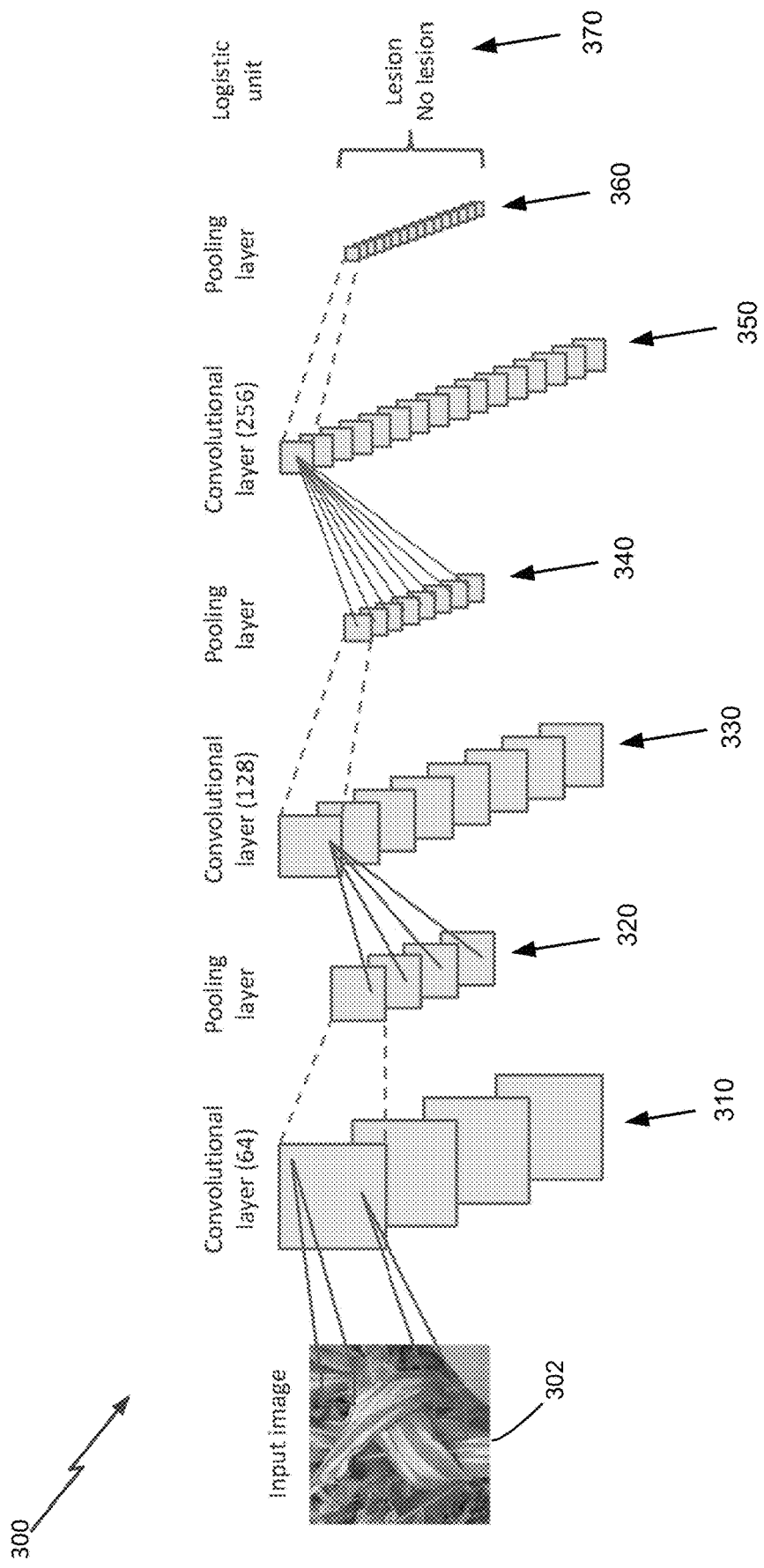
FIG. 3 is a schematic diagram of a convolutional neural network configuration that may be used to perform pattern characteristic detection.

FIG. 3 is a schematic diagram of a convolutional neural network (CNN) configuration 300 that may be used to perform pattern characteristic detection (e.g., to detect presence of crop diseases in crops based on images of the crops). This configuration may be used for each of the learning engines implemented in the pipeline of FIG. 1. The example embodiments of the CNN configuration 300 includes a first convolution layer 310 comprising, for example, 64 filters (more or fewer filters may be used). An input image 302 activates the set of 64 filters in the convolutional layer 310, with each filter associated with a given weight-describing parameters. In some embodiments, every data segments (partitioned or divided during a pre-processing stage) is processed to generate a resultant data point produced by the different filters of the convolutional layer 310.

Coupled to the convolutional layer 310 is a pooling layer 320 configured to decrease the resolution of the resultant data from the layer 310, and to allowing for more filters in subsequent (downstream) layers. Accordingly, additional convolutional layers 330 and 350, located downstream from the first convolution layer 310, are activated by higher-level features and information, with pooling layers (such as the pooling layers 340 and 360) disposed at locations immediately following (in the configurational hierarchy) the convolution layers 330 and 350 respectively, to thus allow for expanding number of filters. Weights are progressively optimized using backpropagation, which estimates how changes in filter weights would affect the final level of error. The weight values of the filters may be determined using one or more optimization techniques, such as gradient descent. A final logistic unit 370 integrates information from top layer(s) to classify the image.

Figure 4:
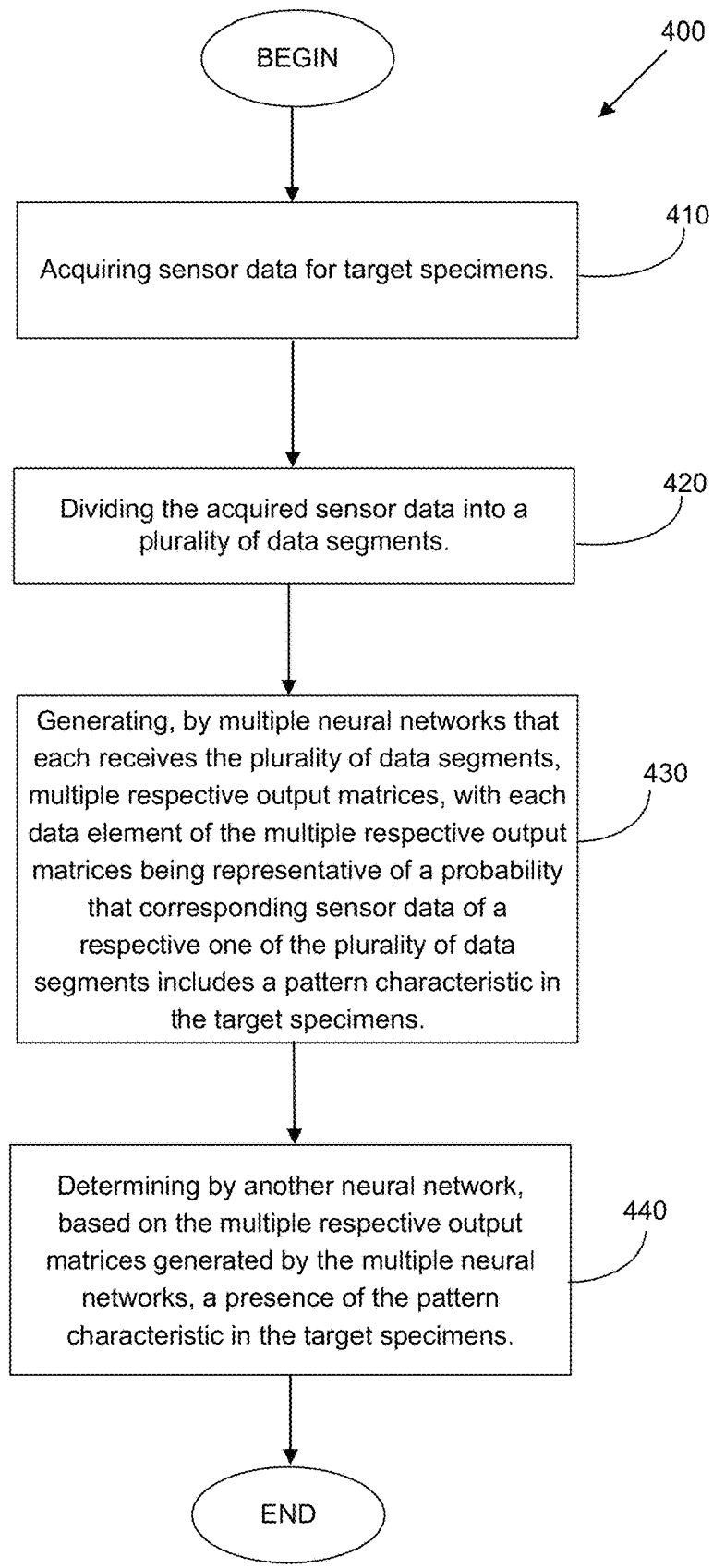
FIG. 4 is a flowchart of an example procedure to detect pattern characteristics in specimens.

With reference next to FIG. 4, a flowchart of an example procedure 400 to detect pattern characteristics (corresponding to different abnormalities) in target specimens is shown. The procedure 400 includes acquiring 410 sensor data for the target specimens. As noted, the target specimens may be any of variety of organisms, including plants, animals (marine or land), humans, sections of cellular tissue (e.g., cancerous tissue from any type of organism), etc. The sensor data acquired may include optical data (visible and/or non-visible range), RF data (electromagnetic data in different RF bands), environmental data (e.g., temperature, humidity, and so on), etc. In some of the example embodiments described herein, acquiring sensor data for the target specimens may include acquiring image data for crop objects. Such crop objects may include corn crops, and in some examples, the abnormality that is to be detected may be a northern leaf blight (NLB) disease. Capturing image data for the crop objects may be performed by capturing one or more of an aerial image of the crop objects (e.g., through drone-mounted camera(s)), and/or a ground-based image of the crop objects (e.g., by a handheld device, by an image-capture device attached to a boom, by an autonomous ground roaming vehicle, etc.)

The procedure 400 further includes dividing 420 the acquired sensor data (be it image data, or some other sensor data) into a plurality of data segments. As discussed, such data segmentation may be performed by a pre-processing processor/controller (such as the controller 112 of FIG. 1) as one of the initial stages of a multi-stage pipeline implementation for the systems/methods described herein.

With continued reference to FIG. 4, the procedure 400 also includes generating 430, by multiple neural networks that each receives the plurality of data segments, multiple respective output matrices (heatmaps), with each data element of the multiple respective output matrices being representative of a probability that corresponding sensor data of a respective one of the plurality of data segments includes a pattern characteristic in the target specimens. As noted, a heatmap generally has smaller dimensions than the data processed by the neural networks, with each element (e.g., a pixel, or a matrix element) holding a value indicative of the probability that a data segment (e.g., an i×j image segment) contains the pattern characteristic (associated with some abnormality, such as NLB disease) being checked for. In some embodiments, the neural networks may be implemented as convolutional neural network (CNN) devices/units. In such example embodiments, generating the multiple respective output matrices may include providing the plurality of data segments to a plurality of convolutional neural network (CNN) devices/units, determining for a particular data segment, from the plurality of data segments, multiple probability values generated respectively by each of the plurality of CNN units, and writing at a particular location, corresponding to the particular data segment, in each of the multiple respective output matrices, respective ones of the multiple probability values determined for the particular data segment.

With the various neural network devices (a subset of such neural networks may be selected from a larger set of networks based, for example, on accuracy or some other performance criterion) having generated the respective output matrices, the procedure 400 also includes determining 440 by another neural network (which also may be a CNN device, or some other type of neural network), based on the multiple respective output matrices generated (e.g., at 430) by the multiple neural networks, a presence of the pattern characteristic in the target specimens. Thus, the other neural network device (which may be similar to the neural network 132 of FIG. 1) may be trained to recognize, based on multiple output matrices it receives as input from the multiple neural networks of the earlier stage (such as the neural networks 112 of FIG. 1, or some other intermediate neural network device(s)), whether the specimen for which the sensor data was acquired has the pattern characteristic (abnormality) the system is configured to detect or recognize. In some variations, determining by the other neural network the presence of the pattern characteristic in the target specimens may include determining by the other neural network the presence of the pattern characteristic in the target specimens further based on at least a portion of the acquired sensor data. In some embodiments, determining the presence of the pattern characteristic in the target specimens may include determining a quantitative measure (percentage) representative of the presence of the pattern characteristic in the target specimens.

As noted, the various neural networks (be it the networks 112 or the network 132) generally need to be trained to properly recognize certain desired features or patterns. For example, in embodiments in which the sensor data acquired is image data for corn crops, and the pattern characteristic is one corresponding to an NLB disease abnormality, the procedure 400 may further include providing training image data to train the multiple neural networks and the other neural network to detect the NLB disease, and training the multiple neural networks and the other neural network using the training image data. The training may include identifying a lesion with a lesion axis in at least one image of the corn crops from the image data, defining multiple image segments of predetermined dimensions that are each shifted, from another of the multiple image segments, by a predetermined length of pixels and having a center at a randomly selected location within a predetermined radius of pixels from the lesion axis of the lesion, and rotating the each of the defined multiple image segments by a random rotation angle.

In some embodiments, the operations of acquiring (at 410), dividing (at 420), generating (at 430), and determining (at 440) may be performed in real-time. Alternatively, in some embodiments, at least some of the operation of dividing (at 420), generating (at 430), and determining (at 440) may be performed offline (e.g., at a remote server to which acquired data is provided or communicated).

Performing the various operations described herein may be facilitated by a controller system (e.g., a processor-based controller system). Particularly, at least some of the various devices/systems described herein, including any of the neural network devices, the pre-processing controller, a remote server or device that performs at least some of the detection operations (such as those described in relation to FIG. 4), etc., may be implemented, at least in part, using one or more processor-based devices.

Figure 5:
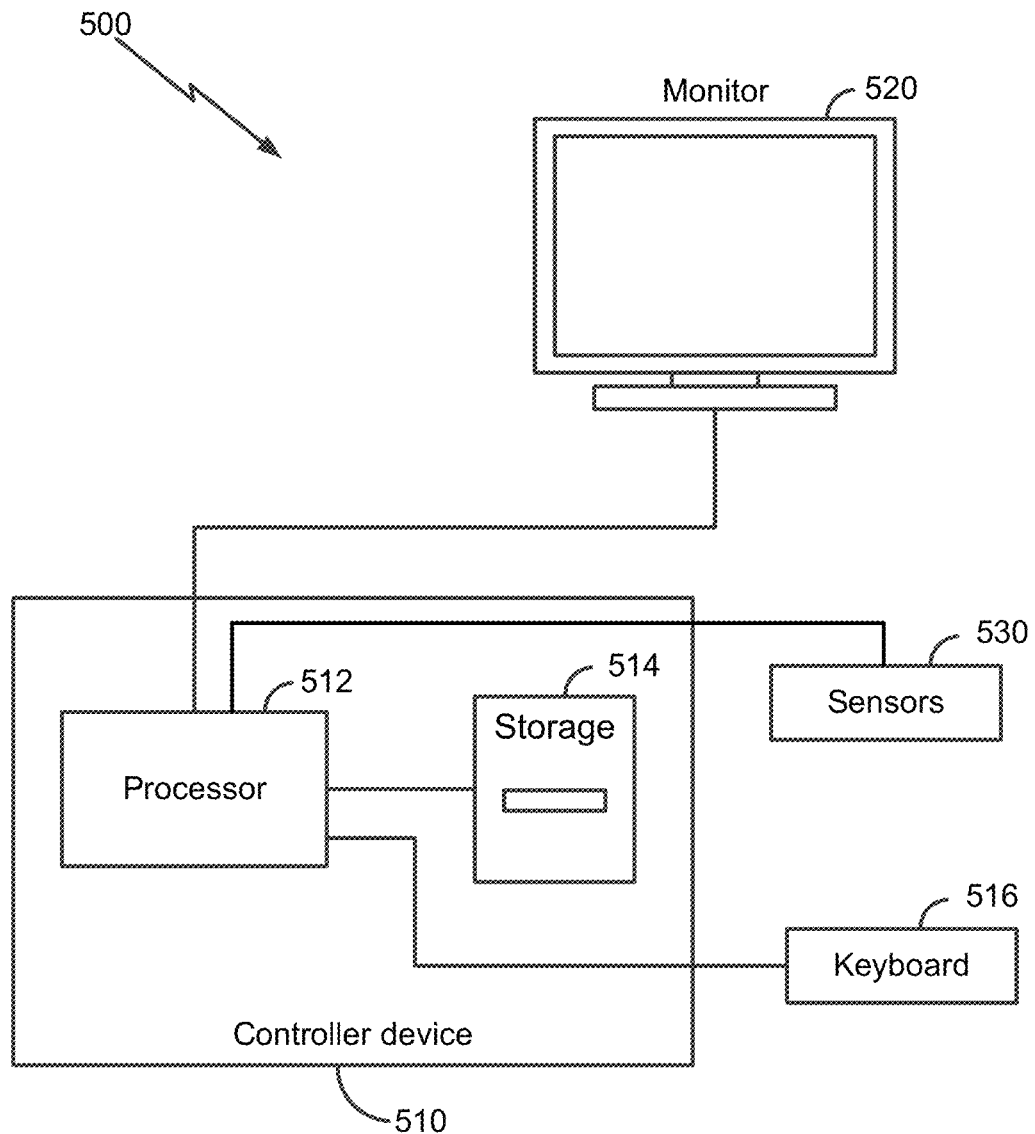
FIG. 5 is a schematic diagram of an example computing system.

Thus, with reference to FIG. 5, a schematic diagram of a computing system 500 is shown. The computing system 500 includes a processor-based device (also referred to as a controller device) 510 such as a personal computer, a specialized computing device, and so forth, that typically includes a central processor unit 512, or some other type of controller. In addition to the CPU 512, the system includes main memory, cache memory and bus interface circuits (not shown in FIG. 5). The processor-based device 510 may include a mass storage element 514, such as a hard drive (realize as magnetic discs, solid state (semiconductor) memory devices), flash drive associated with the computer system, etc. The computing system 500 may further include a keyboard 516, or keypad, or some other user input interface, and a monitor 520, e.g., an LCD (liquid crystal display) monitor, that may be placed where a user can access them.

The processor-based device 510 is configured to facilitate, for example, the implementation of detection of pattern characteristics in target specimens based on the procedures and operations described herein. The storage device 514 may thus include a computer program product that when executed on the processor-based device 510 causes the processor-based device to perform operations to facilitate the implementation of procedures and operations described herein. The processor-based device may further include peripheral devices to enable input/output functionality. Such peripheral devices may include, for example, a CD-ROM drive and/or flash drive (e.g., a removable flash drive), or a network connection (e.g., implemented using a USB port and/or a wireless transceiver), for downloading related content to the connected system. Such peripheral devices may also be used for downloading software containing computer instructions to enable general operation of the respective system/device. Alternatively or additionally, in some embodiments, special purpose logic circuitry, e.g., an FPGA (field programmable gate array), an ASIC (application-specific integrated circuit), a DSP processor, etc., may be used in the implementation of the system 500. Other modules that may be included with the processor-based device 510 are speakers, a sound card, a pointing device, e.g., a mouse or a trackball, by which the user can provide input to the computing system 500. The processor-based device 510 may include an operating system, e.g., Windows XP® Microsoft Corporation operating system, Ubuntu operating system, etc.

Computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal.

In some embodiments, any suitable computer readable media can be used for storing instructions for performing the processes/operations/procedures described herein. For example, in some embodiments computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory), electrically programmable read only memory (EPROM), electrically erasable programmable read only Memory (EEPROM), etc.), any suitable media that is not fleeting or not devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

To test and evaluate the implementations described herein, several experiments were conducted. In one experiment, images of NLB-infected and noninfected leaves were taken with a Canon EOS Rebel or Sony a6000 camera by hand on dates ranging from 28 to 78 days post-inoculation (DPI). Altogether, 1,834 images were taken over eight dates. In total, 38 images were excluded due to poor quality. The images were first classified by presence or absence of any visible lesions in the image. Following this, all visible lesions were marked with a line down the main axis of the lesion using the annotation features of the Bisque image-processing platform hosted on CyVerse (formerly iPlant). Thus, a total of 1,796 images of maize leaves, which included 1,028 images of NLB-infected leaves and 768 images of noninfected leaves were used. The 1,796 images obtained were randomly divided such that 70% of the images were used for training (i.e., to fit the models), 15% for validation (i.e., to estimate prediction error for model and hyperparameter selection), and 15% for testing (i.e., to assess error of the final chosen model). All choices involving network architecture and all training were done without consideration of the test set, which was only used at the end to assess the performance of the final, full system.

There were two image sizes: 6,000 by 4,000 pixels and 5,184 by 3,456 pixels. The images of infected leaves were annotated for NLB lesions with 6,931 lines, or an average of 6.7 lines/image. This was slightly higher than the number of lesions, because lesions that curved due to leaf curvature were annotated with multiple lines. Other sources of senesced leaf tissue were present in both the inoculated and non-inoculated trial. These mainly included physical damage, natural senescence of lower leaves, nitrogen deficiency, feeding from corn flea beetles, and other foliar diseases, particularly northern corn leaf spot. Lesions on inoculated plants were typical of those present in natural infections, and lesion color and shape were generally comparable between the inoculated and non-inoculated plantings.

The three chosen CNN classifiers of the stage 1 system (similar to the system 100 of FIG. 1) achieved accuracies of 81%, 95%, and 94% in classifying small image segments from the validation set. The final stage 3 network (e.g., the CNN 132) was trained on various combinations of the heat maps produced using networks that were trained in stage 1. When those heat maps were combined, the stage 3 network achieved 97.8% accuracy on the validation set. The validation set was used to guide training by helping to make the choice of architecture of the final system as well as determining which heat maps were used and what values were chosen for various hyperparameters in the neural networks.

In order to have an accurate understanding of how the system would perform on new images, a test set of 272 images was left completely unused throughout the entire training procedure. Because the test set did not influence the system in any way, an estimate of error based on it was expected to be unbiased. On this test set, the network achieved an accuracy (number of correctly classified images divided by total number of images) of 96.7%, a precision of 96.8% (number of true positives [i.e., truly diseased] divided by the number of true positives plus false positives), a 97.4% recall (number of true positives divided by the number of true positives plus the number of false negatives), and an F1 score (2×precision×recall, all divided by precision plus recall) of 0.971.

Several issues created challenges to successfully classifying the images. The first was the small number of images to train on; successful application of deep learning techniques typically involves larger training sets, on the order of tens of thousands. Another factor contributing to the task's difficulty lay in the nature of the images themselves. Many types of dead leaf tissue, including natural senescence, can closely resemble NLB lesions to both a CNN and the untrained eye. Variation in lighting, a common issue for images taken in the field, also presented problems. Areas of shadow or, conversely, bright light appearing on a leaf were often mistaken by networks early in training as lesions; they were well represented in the false positives found during hard negative mining. Leaves in the background, dead leaf tissue on the ground, senescing leaves in the lower canopy, and insects also presented challenges.

One significant benefit of the three-stage pipeline was the ability of the system to make use of the full-resolution images. Compared with scaling the images down, cropping them into smaller full-resolution sections in the first stage allowed the network to make use of the fine-grained detail that distinguishes an NLB lesion from other brown spots or dead tissue. On their own, though, the small segment predictions actually presented a problem because of their sheer number. Because the heat maps (matrices of 126 by 193 values) contained scores for 24,318 such segments, even a highly accurate classifier would have many errors in its scores for an entire image. The best stage 1 network achieved an accuracy of 94%; thus, it would be expected that over 1,000 incorrectly classified segments in every one of the heat maps. However, the use of the stage 3 classifier (e.g., the CNN 132 of FIG. 1) mitigates this problem, as the stage 3 classifier learned how to combine all of the local segment scores, including inaccurate ones, into a global classification, achieving 96.7% accuracy on whole images.

The testing and evaluation of the implementations described herein also included a project to collect image data in order to develop a repository of images that could be used for further development of analysis and diagnostic procedures (e.g. based on computer vision and deep learning approaches) for agriculture and other subject matter areas. In that project, image data from several platforms and angles was acquired to help develop a system for real-time monitoring and phenotyping of NLB in maize fields using drones equipped with CNNs. The resulting data set exceeds 18,000 maize plant images annotated with more than 100,000 NLB lesions, which is the largest collection of images for any one plant disease.

More particularly, the data collected in this project included three image sets and their accompanying annotations. All images were taken in field trials of maize that had been inoculated with *Setosphaeria turcica*, the causal agent of NLB. All trials were planted at Cornell University's Musgrave Research Farm in Aurora, N.Y. The trials included maize hybrids from "The Genomes to Fields Initiative," arranged in two-row plots with a length of 5.64 m and inter-row spacing of 0.76 m. There was a 0.76 m alley at the end of each plot. The trials were rainfed and managed with conventional maize cultivation practices. Plants were inoculated at the V5-V6 stage with both a liquid suspension of *S. turcica* (isolate NY001) spores and sorghum grains colonized by the fungus. The first image set, namely, the "handheld set," was taken by hand. The second, namely the "boom set," was taken by mounting the camera on a 5 m boom. This boom held the remotely triggered camera above the canopy with nadir view. The third, the "drone set," was taken by mounting the camera on a DJI Matrice 600 sUAS. The drone was flown at an altitude of 6 m and a velocity of 1 m/s, and images were captured with nadir view every 2 s.

For the handheld and boom sets, images were checked manually to ensure the image was in focus and otherwise adequate. For the drone set, images with a low total length of edges (as reported by canny edge detection) were filtered out, in order to remove blurry images. Images were then discarded during annotation if they were out of focus or otherwise unacceptable. In each image, lesions were annotated by one of two human experts, as denoted in the annotation files. Annotators drew a line down the main axis of each lesion visible in the image, stretching down the entire length of the lesion. If a lesion appeared bent or curved from the camera's perspective, two or more intersecting annotation lines were drawn to form an angle or arc as needed. In the handheld set, this was done with the markup tools in Bisque. In the boom and drone sets, these steps were done using a custom ImageJ macro. Endpoint coordinates of each annotation line were recorded, in this project, in '.csv' data files, each corresponding to a single data set. Images with 0 values for all four endpoint coordinates had no visible lesions.

The number of images and annotation lines were as follows:

Handheld: 1787 images, 7669 annotations.
Boom: 8766 images, 55,919 annotations.
Drone: 7669 images, 42,117 annotations.

Some boom images were ¼ slices of larger images, as a wider field of view made it difficult to annotate the entire image at once. Accordingly, these images were assigned file names with suffixes such as 'img01_00.jpg', 'img01_01.jpg', and so on.

The implementations described herein combine the output of different classifiers to derive a final classification output (e.g., lesion or no-lesion). This ensemble approach shows improved performance over a single classifier. The best result was achieved with a combination of three classifiers in the stage 1 part of the network, so that the system benefited from this effect. However, in some evaluation trials, even when only one network's heat maps was used in the third stage there was still observed significant improvement over the initial, baseline network, which took as input scaled-down versions of the full images. Therefore, the three-stage system's improved performance was not only due to the multi-classification configuration, but also due to other factors. For instance, neural network performance is greatly affected by the amount of data available for training. Because the first stage of the pipeline was trained on small sections of the images instead of the full image, the training set size was effectively increased, at least for the networks in stage 1. One lesion might be broken up into many small regions, for example. The need to break up the images and process them in stages arose, in part, because of memory constraints (it is difficult to feed reasonably-sized batches of full-resolution images into a CNN comprising a reasonable number of convolutional filters per layer). Conceivably, making end-to-end training of the entire pipeline from full-resolution images to final classification, it is possible that performance could be further improved.

On-site diagnosis requires the ability to detect the presence of disease symptoms in images that are not ideal and that contain many potentially confounding factors. Because machine learning techniques typically do not perform as well on data that are significantly different from that on which they were trained, it is recommended that that classifiers be trained on images taken in similar conditions in the field.

The implementations described herein can detect the presence or absence of a disease in an image, information most readily used for estimating disease incidence. This may be useful for growers looking for early detection or breeders evaluating incubation period for a given disease. In some embodiments, some of the implementations described herein may be configured to quantify disease severity. This information could be extracted from the heat maps used for detection. Factors such as distance from the camera, leaf angle, and the amount of non-plant features within the image present challenges for calculating the proportion of diseased versus healthy plant tissue within an image.

While the implementations discussed herein were described in relation to an application to detect NLB, these implementations and approaches can be applied to other plant diseases, as well as to other organisms (e.g., determine existence of cancer tissue in a specimen, determine animal and human diseases and abnormalities, etc.) and/or other fields and subject matter. As noted, in some embodiments, the systems described herein may be mounted on an aerial vehicle. Coupled with autonomous or semiautonomous navigation, sUAS (small unarmed aircraft systems) platforms could provide measures of disease in the field with greater accuracy and the same or less human input than current visual disease monitoring. Such a system could perform the detection operation either in real-time, or offline (in the latter case, a moving platform, such as a drone, would be equipped with sensors to collect data that could be stored and later downloaded to a remote device, or transmit the data to the remote device). In a production setting, the detection system could be coupled with real-time variable-rate fungicide applicators. Such applicators feed measured crop parameters into a decision support system to gauge the required fungicide dosage. This limits fungicide application rates in areas where it is less needed (e.g., based on a determination that the incidence of a particular disease, in a particular area where the crops are growing, is below some threshold) with the dual benefit of reducing fungicide usage and runoff and saving money for growers.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

Although particular embodiments have been disclosed herein in detail, this has been done by way of example for purposes of illustration only, and is not intended to be limiting with respect to the scope of the appended claims, which follow. Features of the disclosed embodiments can be combined, rearranged, etc., within the scope of the invention to produce more embodiments. Some other aspects, advantages, and modifications are considered to be within the scope of the claims provided below. The claims presented are representative of at least some of the embodiments and features disclosed herein. Other unclaimed embodiments and features are also contemplated.

What is claimed is:

1. A method to detect pattern characteristics in target specimens, the method comprising:
   acquiring sensor data for the target specimens;
   dividing the acquired sensor data into a plurality of data segments;
   generating, by multiple neural networks that each receives the plurality of data segments, multiple respective output matrices, with each data element of the multiple respective output matrices being representative of a probability that corresponding sensor data of a respective one of the plurality of data segments includes a pattern characteristic in the target specimens; and determining by another neural network, based on the multiple respective output matrices generated by the multiple neural networks, a presence of the pattern characteristic in the target specimens;

wherein the method further comprises:

providing training image data to train the multiple neural networks and the other neural network to detect northern leaf blight (NLB) disease in corn crops; and training the multiple neural networks and the other neural network using the training image data, including:

identifying a lesion with a lesion axis in at least one image of the corn crops from the image data;

defining multiple image segments of predetermined dimensions that are each shifted, from another of the multiple image segments, by a predetermined length of pixels and having a center at a randomly selected location within a predetermined radius of pixels from the lesion axis of the lesion; and rotating the each of the defined multiple image segments by a random rotation angle.

2. The method of claim 1, wherein the pattern characteristic is indicative of an abnormality of the target specimens.

3. The method of claim 1, wherein acquiring sensor data for the target specimens comprises:

acquiring image data for crop objects.

4. The method of claim 3, wherein acquiring the image data for the crop objects comprises:

capturing one or more of: an aerial image of the crop objects, or a ground-based image of the crop objects.

5. The method of claim 3, wherein the image data for the crop objects comprises one or more images of the corn crops, and wherein the presence of the pattern characteristic in the corn crops is indicative of the presence of the northern leaf blight (NLB) disease in the corn crops.

6. The method of claim 1, wherein generating the multiple respective output matrices comprises:

providing the plurality of data segments to a plurality of convolutional neural network (CNN) units;

determining for a particular data segment, from the plurality of data segments, multiple probability values generated respectively by each of the plurality of CNN units; and writing at a particular location, corresponding to the particular data segment, in each of the multiple respective output matrices, respective ones of the multiple probability values determined for the particular data segment.

7. The method of claim 1, wherein the acquiring, dividing, generating, and determining are performed in real-time.

8. The method of claim 1, wherein at least some of the dividing, generating, and determining are performed offline.

9. The method of claim 1, wherein determining by the other neural network the presence of the pattern characteristic in the target specimens comprises:

determining by the other neural network the presence of the pattern characteristic in the target specimens further based on at least a portion of the acquired sensor data.

10. The method of claim 1, wherein acquiring the sensor data for the target specimens comprises:

acquiring for the target specimens one or more of: visible range optical data, non-visible range optical data, RF data, or environmental data.

11. The method of claim 1, wherein determining the presence of the pattern characteristic in the target specimens comprises:

determining a percentage measure of the pattern characteristic in the target specimens.

12. A detection system to detect pattern characteristics in target specimens, the system comprising:

one or more sensors to acquire sensor data for the target specimens;

a controller to divide the acquired sensor data into a plurality of data segments;

multiple neural networks, each configured to receive the plurality of data segments and to generate multiple respective output matrices, with each data element of the multiple respective output matrices being representative of a probability that corresponding sensor data of a respective one of the plurality of data segments includes a pattern characteristic in the target specimens; and at least one other neural network configured to determine, based on the multiple respective output matrices generated by the multiple neural networks, a presence of the pattern characteristic in the target specimens;

wherein the controller is further configured to:

provide training image data to train the multiple neural networks and the other neural network to detect northern leaf blight (NLB) disease in corn crops; and train the multiple neural networks and the other neural network using the training image data, including to:

identify a lesion with a lesion axis in at least one image, of the corn crops, from the image data;

define multiple image segments, from the at least one image, of predetermined dimensions that are each shifted, from another of the multiple image segments, by a predetermined length of pixels and having a center at a randomly selected location within a predetermined radius of pixels from the lesion axis of the lesion; and rotate the each of the defined multiple image segments by a random rotation angle.

13. The detection system of claim 12, wherein the one or more sensors comprise at least one light-capture device to acquire image data for crop objects, wherein the image data comprises one or more of: an aerial image of the crop objects, or a ground-based image of the crop objects.

14. The detection system of claim 13, wherein the image data for the crop objects comprises one or more images of the corn crops, and wherein the presence of the pattern characteristic in the corn crops is indicative of the presence of the northern leaf blight (NLB) disease in the corn corps.

15. The detection system of claim 12, wherein the multiple neural networks configured to generate multiple respective output matrices are each configured to:

provide the plurality of data segments to a plurality of convolutional neural network (CNN) units;

determine for a particular data segment, from the plurality of data segments, multiple probability values generated respectively by each of the plurality of CNN units; and write at a particular location, corresponding to the particular data segment, in each of the multiple respective output matrices, respective ones of the multiple probability values determined for the particular data segment.

16. The detection system of claim 12, wherein the at least one other neural network configured to determine the presence of the pattern characteristic in the target specimens is configured to:
  determine the presence of the pattern characteristic in the target specimens further based on at least a portion of the acquired sensor data.

17. The detection system of claim 12, wherein at least one of the one or more sensors comprises one or more of: a visible range optical sensor, a non-visible range optical sensor, a RF receiver, or a sensor to measure one or more environmental characteristics.

18. A non-transitory computer readable media storing a set of instructions, executable on at least one programmable device, to:
  acquire sensor data for target specimens;
  divide the acquired sensor data into a plurality of data segments;
  generate, by multiple neural networks that each receives the plurality of data segments, multiple respective output matrices, with each data element of the multiple respective output matrices being representative of a probability that corresponding sensor data of a respective one of the plurality of data segments includes a pattern characteristic in the target specimen; and
  determine by another neural network, based on the multiple respective heatmaps generated by the multiple neural networks, a presence of the abnormality in the target specimens;
wherein the set of instructions comprises one or more further instructions, executable on the at least one programmable device, to further:
  provide training image data to train the multiple neural networks and the other neural network to detect northern leaf blight (NLB) disease in corn crops; and
  train the multiple neural networks and the other neural network using the training image data, including to:
    identify a lesion with a lesion axis in at least one image, of the corn crops, from the image data;
    define multiple image segments, from the at least one image, of predetermined dimensions that are each shifted, from another of the multiple image segments, by a predetermined length of pixels and having a center at a randomly selected location within a predetermined radius of pixels from the lesion axis of the lesion; and
    rotate the each of the defined multiple image segments by a random rotation angle.

* * * * *